United States Patent Office
3,563,728
Patented Feb. 16, 1971

1

3,563,728
AUSTENITIC STAINLESS STEELS FOR USE IN NUCLEAR REACTORS
Robert J. Allio, Monroeville, and Kenneth C. Thomas and Harry M. Ferrari, Pittsburgh, Pa., assignors to Westinghouse Electric Corporation, Pittsburgh, Pa., a corporation of Pennsylvania
Continuation of application Ser. No. 455,781, May 14, 1965. This application Mar. 12, 1968, Ser. No. 712,572
Int. Cl. C22c 39/00
U.S. Cl. 75—128   4 Claims

ABSTRACT OF THE DISCLOSURE

An austenitic stainless steel for use in a water nuclear reactor wherein the steel is in contact with coolant at elevated temperature and pressure, the alloy characterized in that it has a low neutron capture cross-section, is highly resistant to stress corrosion in the presence of chlorides and has a relatively high strength, consisting essentially of by weight, from 17 to 22% nickel, from 14 to 19% chromium, from 0.007 to 0.015% carbon, a maximum of 0.015% nitrogen, the total of carbon and nitrogen not exceeding 0.025%, a maximum of 1.5% manganese and 0.02% cobalt, manganese and cobalt are elements which when exposed to a neutron flux are transformed at least in part to radioactive isotopes of high activity, a maximum of 0.5% silicon, other impurities not exceeding 0.5%, and the balance iron. A nuclear fuel element cladding employing said steel is also disclosed.

---

This application is a continuation of application Ser. No. 455,781, filed May 14, 1965, and now abandoned.

The present invention is directed to austenitic stainless steels suitable for use in a radioactive environment such as an atomic reactor under conditions in which the known austenitic chromium-nickel stainless steels have been found to be susceptible to stress-corrosion cracking.

The alloys described herein are intended for use in reactors in which water is the coolant in contact with the fuel elements. Several types of reactors employ water as coolant and, therefore, in this description the terms "water" or "coolant" will be understood to include pressurized water, boiling water, steam and supercritical fluid.

Fuel elements for atomic reactors are generally produced in rod form and consist of a core composed of fuel material surrounded by a metal cladding. The metal cladding provides structural support for the fuel material and minimizes contamination of the reactor coolant by preventing direct contact between the coolant and the fuel material. Zirconium-base alloys of the type known as "Zircaloy" alloys have successfully been employed as fuel element cladding, but these alloys are quite expensive and a less costly substitute has been sought. Thus, austenitic stainless steel has been employed as fuel element cladding.

It is well-known that austenitic chromium-nickel stainless steels have an array of desirable properties which have resulted in a large number of industrial and commercial applications. Austenitic stainless steels are readily workable, have high strength at room and elevated temperatures and display high resistance to corrosive environments encountered in many applications.

However, despite the designation "stainless," the phenomenon of corrosion is not unknown to the austenitic stainless steels, and, in fact, many troublesome problems arise as the result of corrosion of these materials. The present invention concerns the phenomenon of stress-corrosion and is related to the effect of a corrosive environment on an alloy member under stress; the stress may be either residual or externally applied.

2

As utilized in a water reactor, the stainless steel is present as a cladding on the nuclear fuel elements or rods, and is in contact with the coolant water at elevated temperature and pressure and at the same time is exposed to the neutron flux which originates in the fuel material of the fuel elements. The cladding is of sufficient thickness to provide the required support, but is as thin as possible to reduce absorption of neutrons. Absorption of neutrons by the cladding reduces the efficiency of the reactor.

Water of extremely high purity is employed in these reactors and the chloride concentration (chloride being the principal offender in stress-corrosion of stainless steel) is extremely low, the overall chloride ion concentration being about 1/10 part per million. Despite the low average concentration of chloride ion, very serious corrosion problems affect the utility of stainless steels in the described environment and it has been postulated that substantially higher concentrations of chloride occur at the surface of the fuel elements as the result of boiling at these surfaces with resultant deposition of chlorides. Such high local concentrations of chloride accelerate stress-corrosion.

Another problem associated with the operation of nuclear reactors is the handling, transportation and reprocessing of the spent fuel elements which become highly radioactive as the result of their exposure to the radiation in the reactor.

Accordingly, it is the primary object of this invention to provide austenitic stainless steel alloys for water reactor applications having superior stress-corrosion resistance, weldability, fabricability, reasonable strength and a low thermal neutron absorption cross-section.

Other objects of this invention will, in part, be obvious and will, in part, appear hereinafter.

A clearer understanding of this invention may be gained by reference to the drawings, in which.

Figure 1:
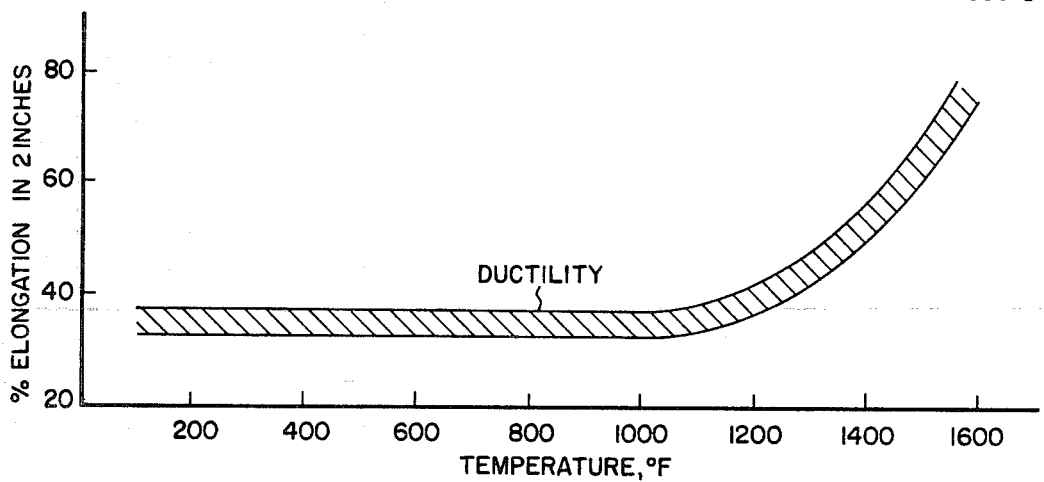
FIG. 1 is a graph showing the ductility of the alloy of this invention in the annealed condition in which percent elongation in two inches is plotted against the temperature in degrees Fahrenheit.

The invention, then, is directed to austenitic stainless steel alloys which exhibit high resistance to stress corrosion and good strength and low thermal neutron absorption cross-section in a water reactor environment. More particularly, the invention is directed to alloys, particularly in the form of cladding for nuclear fuel elements, composed of a substantially austenitic stainless steel comprising, by weight, from 17 to 22% nickel, from 14 to 19% chromium, from .007 to .015% carbon, a maximum of 0.015% nitrogen, the total of carbon and nitrogen not exceeding 0.025%, a maximum of 1.5% manganese, a maximum of 0.02% cobalt, manganese and cobalt being elements which when exposed to a neutron flux are transformed at least in part to radioactive isotopes of high activity, a maximum of 0.5% silicon, other impurities not exceeding a total of 0.5%, and the balance iron. With respect to impurities which may be present, the sulfur is limited to a maximum of 0.05%, the phosphorous is limited to a maximum of 0.05%, aluminum is limited to a maximum of 0.05%, titanium is limited to a maximum of 0.15% and molybdenum is limited to a maximum of 0.05%.

A preferred composition of the alloys of this invention comprises, by weight, about 20% nickel, about 16% chromium, about 0.01% carbon, a maximum of 0.015% nitrogen, the total of carbon and nitrogen not exceeding 0.025%, a maximum of 1.5% manganese and 0.02% cobalt, these two being elements which when exposed to a neutron flux are transformed at least in part to radioactive isotopes of high activity, a maximum of 0.5% silicon, other impurities not exceeding 0.5% total, and the balance iron.

The principal elements found in austenitic stainless steels of the type to which this invention is directed, which form radioactive products having high activity, are manganese and cobalt. When spent fuel elements contain substantial amounts of radioactive products having high activity additional precautions must be taken in handling the fuel elements, or one must wait until the activity has decreased enough to permit safe handling. Such added precautions or delays in storage increase the cost of handling. Up to 1.5% manganese can be present in the alloys of the invention while a maximum of 0.02% of cobalt can similarly be tolerated. Of course, it is preferred that the amounts of these materials present in the alloys be kept as low as is feasible.

Some carbon is desirable in the alloys of this invention; tests showing that increasing the carbon content from 0.009% to 0.030% increases the yield strength in the annealed condition from about 17,000 p.s.i. to 24,000 p.s.i. When the carbon content is below 0.007%, yield strengths below 15,000 p.s.i. are obtained and such a material is not satisfactory for use in nuclear reactors. However, stainless steels containing amounts of carbon in excess of 0.015% precipitate chromium carbides at the grain boundaries when heated in about the 900–1300° F. temperature range. This is the phenomenon known as "sensitization." In sensitized steels oxidation and corrosion reactions can take place at the grain boundaries under certain environmental conditions which may lead to crack formation and failure of the component. Accordingly, the carbon in the alloy of this invention is limited to .015% max. to reduce the tendency toward sensitization of the steel.

The limitation on the amount of nitrogen; that is, a maximum of 0.015%, is important for the reason that excess nitrogen adversely affects the stress-corrosion resistance.

Due to the possibility of formation of intermetallic compounds of titanium and aluminum which harden and reduce the ductility of the steel after long time exposure to high temperatures, the amount of these elements must be limited. The titanium may be present in amounts ten times the carbon content, or a maximum of 0.15%, since titanium does tie up carbon and thereby minimizes sensitization and enhances weldability. The aluminum should be limited to a maximum of 0.05%.

An alloy in accordance with this invention was made having the composition as set forth in the following Table I.

TABLE I

| Chromium | 16.55 |
|---|---|
| Nickel | 20.55 |
| Carbon | 0.009 |
| Nitrogen | 0.009 |
| Manganese | 0.007 |
| Cobalt | 0.002 |
| Silicon | 0.06 |
| Phosphorous | 0.004 |
| Sulfur | 0.002 |
| Aluminum | <0.05 |
| Titanium | 0.0008 |
| Molybdenum | 0.04 |
| Iron | Balance |

Figure 2:
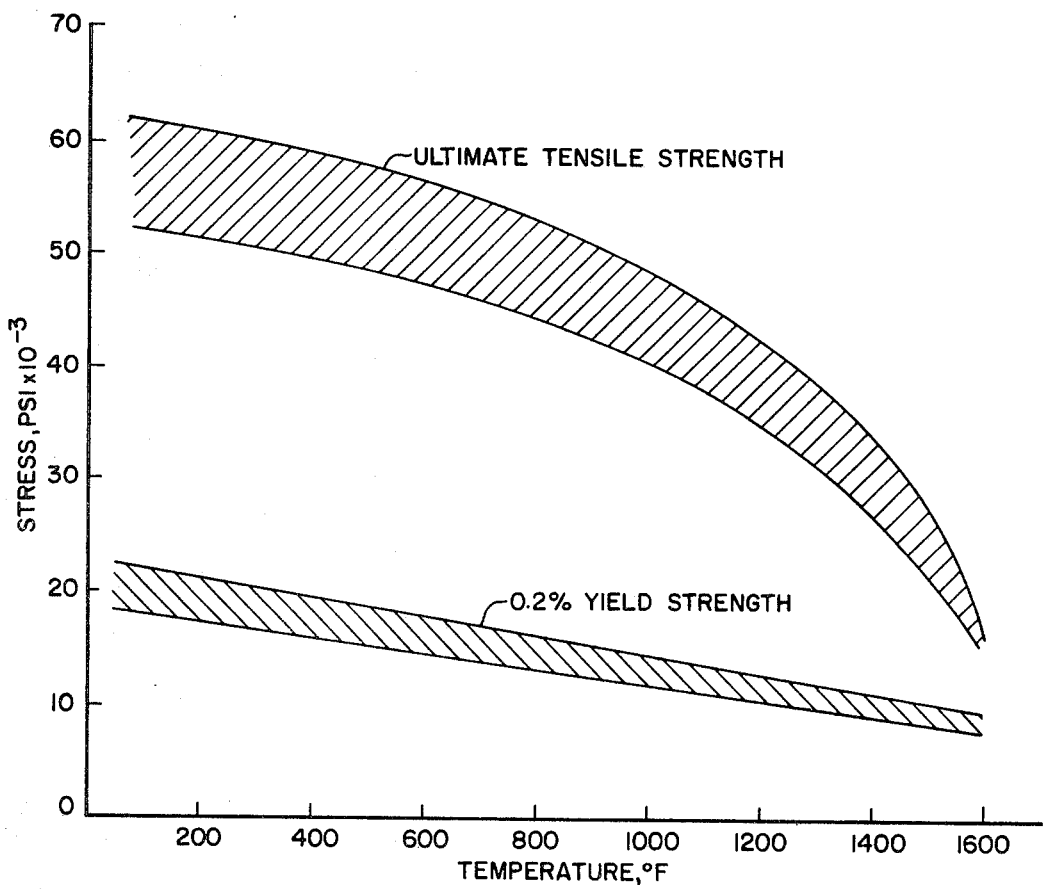
FIG. 2 is a graph in which the stress is plotted against the temperature in degrees Fahrenheit and shows both the ultimate tensile strength and the 0.2% yield strength for the alloys of this invention.
Figure 3:
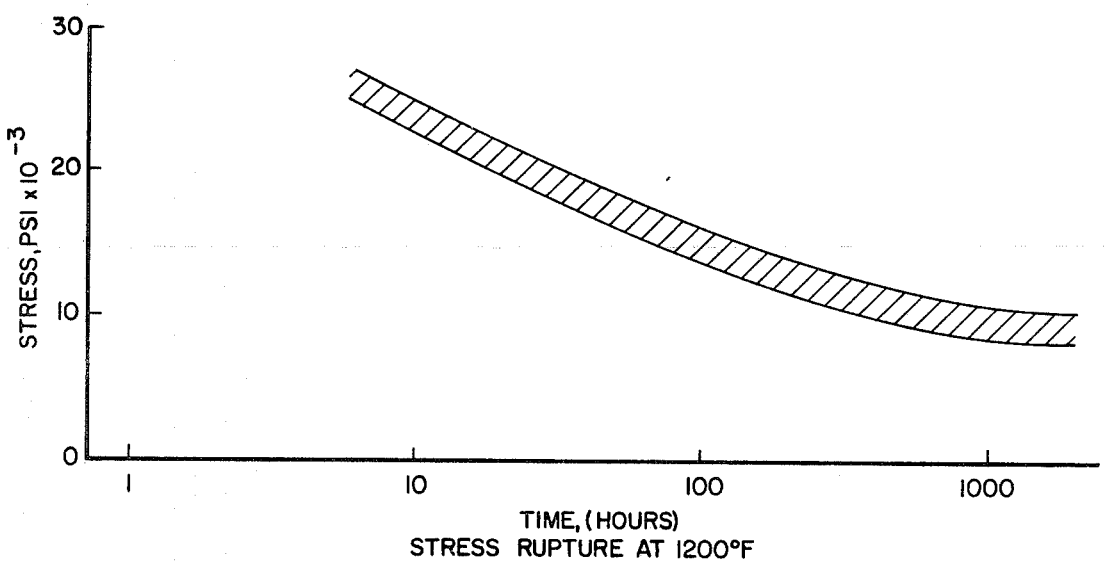
FIG. 3 shows the stress rupture properties at 1200° F. in which the stress is plotted against the time in hours.

Referring now to FIGS. 1, 2 and 3 which are directed to the mechanical properties of a series of the alloys of this invention in the annealed condition, it will be seen that, both as to ductility and as to strength in general, the mechanical properties of the alloys are at a satisfactory level. That is to say that the alloys of the invention can be cold worked to obtain a yield strength of about 70,000 p.s.i. which is the strength level of the cold worked 304 stainless steel now commonly used for fuel cladding in water reactors.

Figure 4:
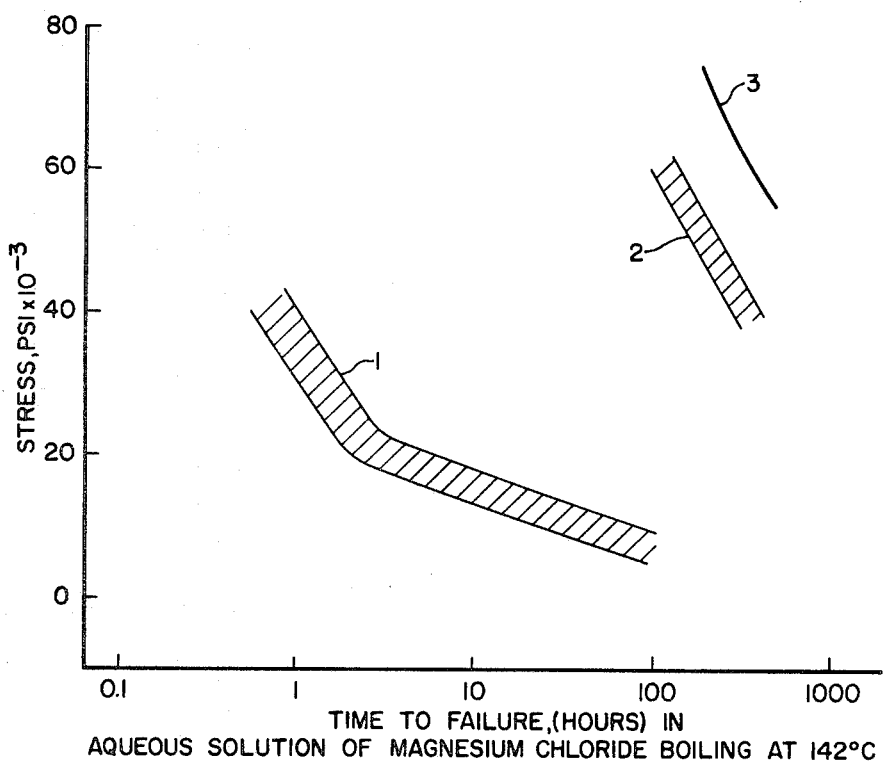
FIG. 4 shows the stress-corrosion properties in a corrosive solution of magnesium chloride in which the stress is plotted against the time to failure both for alloys of the prior art, and for the alloys of this invention.

FIG. 4 shows the time to failure for several materials, including the alloy of this invention, in an aqueous solution of magnesium chloride boiling at 142° C. The superiority of the alloy of this invention (curve 2) under stress, in this highly corrosive environment, in comparison with a 304 stainless steel 1 is quite apparent. In fact, the alloy compares favorably with Incoloy-800 (curve 3), a rather costly alloy having substantially greater nickel content and hence greater neutron absorption cross-section.

The microscopic thermal neutron absorption cross-section of the alloys of this invention is 0.266 cm.$^{-1}$. The similar maximum value for 304 stainless steel is 0.248 cm.$^{-1}$ and for Incoloy-800 it is 0.300 cm.$^{-1}$. The greater the neutron absorption cross-section of a material the more neutrons absorbed by the material, and the less efficient is the fuel element clad thereby.

In the annealed condition the structure of the alloys of the present invention consists of equiaxed austenite grains, a proportion which contain annealing twins. Because of the high nickel content, essentially no ferrite is present. Electron micrographs show dislocation tangles after small amounts of strain, i.e., up to 8%. Conversely, after exposure to similar strains, 304 stainless steel exhibits planar arrangements of dislocations. This ability of dislocations to form tangles, rather than planar groupings, is considered responsible for the excellent stress-corrosion resistance of the alloys of this invention. However, applicant does not wish to be bound by any particular theory which explains the superior results obtained by using the alloys of the invention.

Uranium dioxide fuel elements have been provided with a cladding of the alloys of the invention and several of these fuel elements have been installed for test purposes in an operating reactor core for nearly one year. The cladding has remained intact over this period.

One factor which affects the economics of the use of a particular fuel element is the ease with which the fuel element may be reprocessed after use to reclaim unfissioned uranium and fission products such as plutonium. This reprocessing, as practiced, involves removal of the fuel element cladding by a gaseous oxidation treatment. Type 304 stainless steel is declad at the rate of about 60 mils/hour in a gaseous mixture of 40% hydrogen fluoride and 60% oxygen at about 600° C. The alloy of this invention declads at the rate of about 30 mils/hour under the same conditions, which is acceptable for economic reprocessing. A 32% nickel-2% chromium-iron alloy (Incoloy-800), on the other hand, shows no appreciable attack under similar conditions.

It will be understood by those skilled in the art that although the present invention has been described in connection with preferred embodiments, modifications and variations may be employed without departing from the underlying spirit and scope of the invention. It is intended to claim all such variations and modifications.

We claim as our invention:

1. An austenitic stainless steel for use in a water nuclear reactor wherein the steel is in contact with coolant at elevated temperature and pressure, the alloy characterized in that it has a low neutron capture cross-section, is highly resistant to stress corrosion in the presence of chlorides and has a relatively high strength, consisting essentially of by weight, from 17 to 22% nickel, from 14 to 19% chromium, from 0.007 to 0.015% carbon, a maximum of 0.015% nitrogen, the total of carbon and nitrogen not exceeding 0.025%, a maximum of 1.5% manganese and 0.02% cobalt, manganese and cobalt are elements which when exposed to a neutron flux are transformed at least in part to radioactive isotopes of high activity, a maximum of 0.5% silicon, other impurities not exceeding 0.5%, and the balance iron.

2. An austenitic stainless steel wrought cladding for nuclear fuel elements for use in pressurized water nuclear reactors wherein the cladding is in contact with cooling water at elevated temperature and pressure, the alloy characterized in that it has a neutron capture cross-section of 0.266 cm.$^{-1}$, a composition in which the quantity of elements susceptible on exposure to a neutron flux of transformation to radioactive isotopes of high activity is closely controlled, is highly resistant to stress corrosion in the presence of chlorides and has a relatively high strength, consisting essentially of by weight, from 17 to 22% nickel, from 14 to 19% chromium, from 0.007 to 0.015% carbon, a maximum of 1.5% manganese and 0.02% cobalt, manganese and cobalt being elements which form radioactive isotopes of high activity upon exposure to a neutron flux, a maximum of 0.015% nitrogen, the total of nitrogen and carbon not exceeding 0.025%, a maximum of 0.5% silicon, a maximum of 0.05% sulfur, a maximum of 0.05% phosphorous, a maximum of 0.05% aluminum, a maximum of 0.15% titanium, a maximum of 0.05% molybdenum and the balance of the alloy being iron.

3. Austenitic stainless steel cladding for nuclear fuel elements in water reactors consisting essentially of by weight, about 20% nickel, about 16% chromium, about 0.01% carbon, a maximum of 0.015% nitrogen, the total of carbon and nitrogen not exceeding 0.025%, a maximum of 1.5% manganese and 0.02% cobalt, manganese and cobalt being elements which when exposed to a neutron flux are transformed at least in part to radioactive isotopes of high activity, a maximum of 0.5% silicon, other impurities not exceeding 0.5% and the balance iron.

4. A cold-worked austenitic stainless steel cladding for nuclear fuel elements having good resistance to stress corrosion in the presence of chlorides consisting essentially of by weight, about 20% nickel, about 16% chromium, about 0.01% carbon, a maximum of 0.015% nitrogen, the total of carbon and nitrogen not exceeding 0.025%, a maximum of 1.5% manganese and 0.02% cobalt, manganese and cobalt being elements which transform to radioactive isotopes having high activity when exposed to the neutron flux in a nuclear reactor, a maximum of 0.05% silicon, a maximum of 0.05% sulfur, a maximum of 0.05% phosphorous, a maximum of 0.05% aluminum, a maximum of 0.15% titanium, a maximum of 0.05% molybdenum, and the balance iron, the alloy in an aqueous solution of boiling magnesium chloride having a life in excess of 100 hours at a stress level of 40,000 p.s.i.

References Cited

UNITED STATES PATENTS

| 2,941,883 | 6/1960 | Ida | 75—124 |
| 3,159,480 | 12/1964 | Copson | 75—128 |
| 3,159,479 | 12/1964 | Copson | 75—128 |
| 3,301,668 | 1/1967 | Cope | 75—128 |

L. DEWAYNE RUTLEDGE, Primary Examiner

P. WEINSTEIN, Assistant Examiner

U.S. Cl. X.R.

29—196; 176—91